US012317921B2

(12) United States Patent
Kracl et al.

(10) Patent No.: US 12,317,921 B2
(45) Date of Patent: Jun. 3, 2025

(54) CIGAR HOLDER

(71) Applicant: StogeeSleeve LLC, Mesa, AZ (US)

(72) Inventors: Kristine Ann Kracl, Mesa, AZ (US); Christopher Jon Wiegele, Mesa, AZ (US); Richard O. Gregory, II, York, SC (US)

(73) Assignee: StogeeSleeve LLC, Mesa, AZ (US)

( * ) Notice: Subject to any disclaimer, the term of this patent is extended or adjusted under 35 U.S.C. 154(b) by 0 days.

(21) Appl. No.: 18/798,455

(22) Filed: Aug. 8, 2024

(65) Prior Publication Data

US 2024/0398000 A1 Dec. 5, 2024

Related U.S. Application Data

(63) Continuation of application No. 18/421,719, filed on Jan. 24, 2024.

(Continued)

(51) Int. Cl.

*A24F 13/12* (2006.01)
*A24F 13/08* (2006.01)

(Continued)

(52) U.S. Cl.

CPC .............. *A24F 13/12* (2013.01); *A24F 13/08* (2013.01); *A24F 13/22* (2013.01); *H01F 7/02* (2013.01)

(58) Field of Classification Search

None

See application file for complete search history.

(56) References Cited

U.S. PATENT DOCUMENTS 2,192,569 A 3/1940 Williams
2,594,955 A 4/1952 Markowitz (Continued)

FOREIGN PATENT DOCUMENTS

GB 2562472 11/2018
WO 2019075201 4/2019

OTHER PUBLICATIONS

Amazon; Article entitled: "Stickit Magnetic Towel, Gray, Top-Tier Microfiber Golf Towel with Deep Waffle Pockets. Industrial Strength Magnet for Strong Hold to Golf Carts or Clubs", located at <https://www.amazon.com/STICKIT-Magnetic-Top-Tier-Microfiber-Industrial/dp/B07B1F4Z33/ref=asc_df_B07B1F4Z33/?hvadid=31&linkCode=df0&tag>, publicly available prior to Dec. 12, 2023, 9 pgs.

(Continued)

*Primary Examiner* — Phu H Nguyen

(74) *Attorney, Agent, or Firm* — Taylor English Duma LLP

(57) ABSTRACT

A cigar holder can include an annular body defining an inner surface and an outer surface; the annular body comprising: a protrusion extending outward in a radial direction from a surrounding portion of the outer surface with respect to an axis of the annular body; and a plurality of protuberances, each of the plurality of protuberances extending in a radial direction from a surrounding portion of the inner surface with respect to the axis of the annular body; and a magnet coupled to the annular body. A cigar holder can alternatively include an annular body defining an inner surface and outer surface and formed from an elastomeric material, the annular body comprising a protrusion extending from the outer surface of the annular body; and a magnet coupled to the annular body.

30 Claims, 13 Drawing Sheets

Related U.S. Application Data

(60) Provisional application No. 63/609,056, filed on Dec. 12, 2023.

(51) Int. Cl.

| | |
|---|---|
| ***A24F 13/22*** | (2006.01) |
| ***H01F 7/02*** | (2006.01) |

(56) References Cited

U.S. PATENT DOCUMENTS

| | | | | |
|---|---|---|---|---|
| D400,298 | S | 10/1998 | Mgnerot | |
| 6,022,280 | A | 2/2000 | Arenburg et al. | |
| 6,530,510 | B2 | 3/2003 | Ferrari | |
| 6,994,639 | B2 | 2/2006 | Parks et al. | |
| 8,235,262 | B1 | 8/2012 | Sakdol | |
| D753,875 | S | 4/2016 | Corcoran et al. | |
| 10,034,526 | B2 | 7/2018 | Gamblin et al. | |
| 10,167,884 | B2 | 1/2019 | Bulat | |
| 10,421,311 | B2 | 9/2019 | Mullen | |
| 10,624,441 | B1 | 4/2020 | Sullivan | |
| D890,985 | S | 7/2020 | Attar | |
| D894,482 | S | 8/2020 | Schumacher | |
| D901,070 | S | 11/2020 | Spektor | |
| 10,874,200 | B2 | 12/2020 | Laskin et al. | |
| 11,051,595 | B1 | 7/2021 | Yim | |
| D964,645 | S | 9/2022 | Sillen, Jr. | |
| D967,519 | S | 10/2022 | Zhang | |
| 2010/0139673 | A1 | 6/2010 | Miller | |
| 2010/0219217 | A1 | 9/2010 | Andochick | |
| 2011/0308048 | A1 | 12/2011 | Raccah | |
| 2015/0007833 | A1 | 1/2015 | Orvis et al. | |
| 2015/0130572 | A1 | 5/2015 | Goirigolzatti | |
| 2015/0201672 | A1* | 7/2015 | Tschan, II | A24D 1/16 40/321 |
| 2016/0052462 | A1 | 2/2016 | Heilgendorf | |
| 2017/0349327 | A1 | 12/2017 | Cwojdzinski | |
| 2018/0064164 | A1 | 3/2018 | Wilkerson et al. | |
| 2018/0116276 | A1 | 5/2018 | Prog et al. | |
| 2019/0191907 | A1 | 6/2019 | Reed | |
| 2019/0298047 | A1 | 10/2019 | Vanettes | |
| 2021/0052000 | A1 | 2/2021 | Avedissian | |
| 2021/0360969 | A1 | 11/2021 | Johnson | |
| 2022/0232887 | A1* | 7/2022 | Pikowski | A24F 13/22 |
| 2023/0016079 | A1 | 1/2023 | Keen, Sr. | |
| 2023/0017077 | A1 | 1/2023 | Rossi et al. | |

OTHER PUBLICATIONS

Amazon; Article entitled: "Ovatavo Cigar Holder Clip for Golf Cart—Strong Magnetic Grip for Golf, Travel, Hunting Fishing and Boating, Holds 46-Ring Gauges and Above", located at <https://www.amazon.com/OVATAVO-Cigar-Holder-Clip-Golf/dp/B098JG9YNB/ref=pd_Ipo_3?pd_rd_i=B098JG9YNB&psc=1>, accessed on May 17, 2022, 5 pgs.

Ciccar; Article entitled: "3pcs Magnet Ring Pack", located at <https://web.archive.org/web/20221212113234/https://ciccarlife.com/product/3pcs-magnet-ring-pack/>, accessed on Oct. 29, 2023, 3 pgs.

Cigar Bandit; Article entitled: "Cigar Holder with Built in Golf Ball Marker" located at <https://www.thecigarbandit.com/products/cigar-bandit?>, accessed on May 17, 2022, 5 pgs.

Kracl, Kristine Ann; International Search Report and Written Opinion for PCT Application No. PCT/US2024/059907, filed Dec. 12, 2024, mailed Mar. 31, 2025, 20 pgs.

* cited by examiner

CIGAR HOLDER

REFERENCE TO RELATED APPLICATIONS

This application is a continuation of U.S. application Ser. No. 18/421,719, filed Jan. 24, 2024, which claims the benefit of U.S. Provisional Application No. 63/609,056, filed Dec. 12, 2023, each of which is hereby specifically incorporated by reference herein in its entirety.

TECHNICAL FIELD

Field of Use

This disclosure relates to an object holder configured to attach to any one of multiple surfaces. More specifically, this disclosure relates to a magnetic object holder that can hold a cigar or other smoked product.

Related Art

Cigarette and cigar holders have been around for a few hundred years in order to allow for the holding and storage of a user's smoking object of choice. Since at least the early 1900's, cigarette holders were used to cool smoke and provide the user a grip on the object without being near the heat of the combustible tobacco. Cigar holders evolved similarly, but advanced to clips or stands in order to allow the cigar to continue to smolder without the user having to hold the cigar at a specific angle, or to keep inhaling it. The design of these holders has been incorporated into stands and ashtrays, which allow a cigar to be set down and not need to be relit.

Modern cigar holders typically hold the cigar at an angle, include a clip to grab the sides of the cigar to ensure the angle held remains the same, and include a base or stand. Present cigar holders are typically only able to rest on a flat surface or require clipping to a structure and can rub or scrape the cigar and, more specifically, an outer surface thereof if the clip slips or the cigar is pulled from the clip. Present cigar holders thus can be held in only limited orientations and can tear and damage the outside of the cigar.

SUMMARY

It is to be understood that this summary is not an extensive overview of the disclosure. This summary is exemplary and not restrictive and is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a cigar holder comprising an annular body defining an inner surface and outer surface; the annular body comprising: a protrusion extending outward in a radial direction from a surrounding portion of the outer surface with respect to an axis of the annular body; and a plurality of protuberances, each of the plurality of protuberances extending inward in a radial direction from a surrounding portion of the inner surface with respect to the axis of the annular body; and a magnet coupled to the annular body.

In a further aspect, disclosed is a cigar holder comprising an annular body defining an inner surface and outer surface and comprising an elastomeric material, the inner surface defining a diameter sized to receive a cigar therein, the cigar defining a ring gauge of at least 30 and at most 75; the annular body comprising a protrusion extending in a radial direction from a surrounding portion of the outer surface of the annular body with respect to an axis of the annular body, the protrusion defining a protrusion height measuring less than or equal to two times a minimum wall thickness of the annular body; and a magnet coupled to the annular body by being received within the annular body.

In a further aspects, disclosed is a method of manufacturing a cigar holder, the method comprising: positioning a magnet within a mold; forming within the mold an annular body defining an inner surface and an outer surface, a material forming the cigar holder at least partially enclosing the magnet; and forming within the mold one of an opening and a plurality of protuberances in the inner surface of the annular body, the opening extending radially outward from the inner surface to the outer surface and configured to allow stretching of the annular body to increase a diameter of the annual body and the plurality of protuberances extending radially inward from the inner surface.

In yet another aspect, disclosed is a cigar holder comprising: an annular body defining an inner surface and an outer surface; and a magnet coupled to the annular body.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description, explain various principles of the disclosure. The drawings are not necessarily drawn to scale. Corresponding features and components throughout the figures can be designated by matching reference characters for the sake of consistency and clarity.

DETAILED DESCRIPTION

Figure 1A:
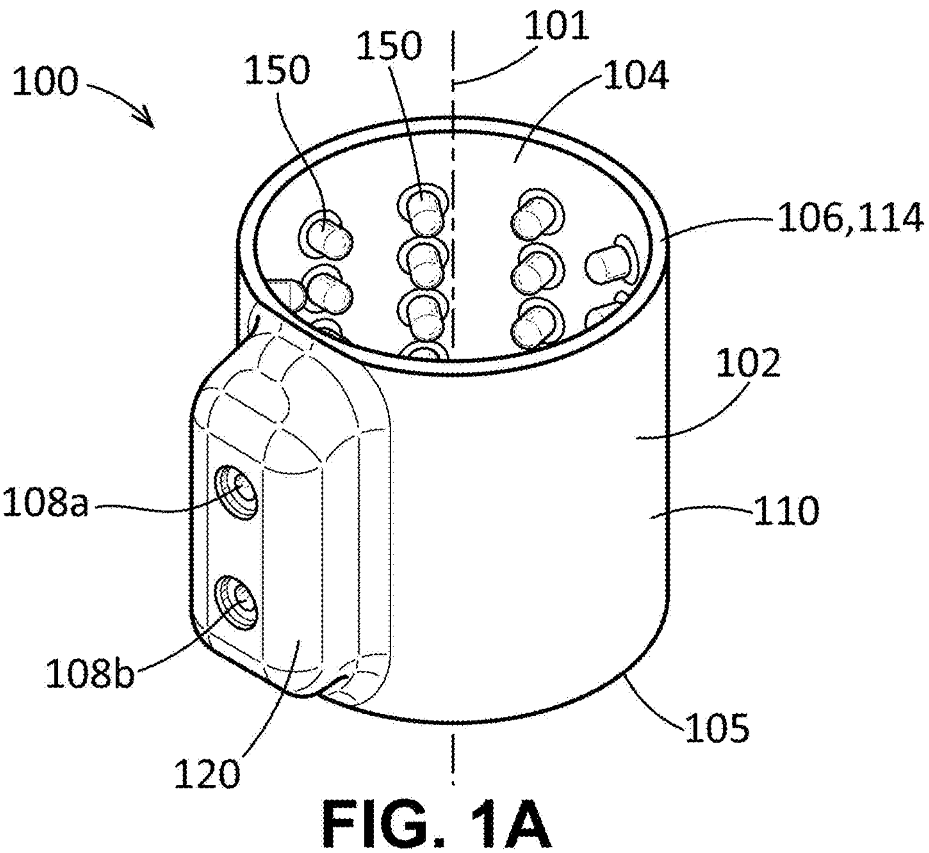
FIG. 1A is a front top right perspective view of a cigar holder in accordance with a first aspect of the current disclosure.
Figure 1B:
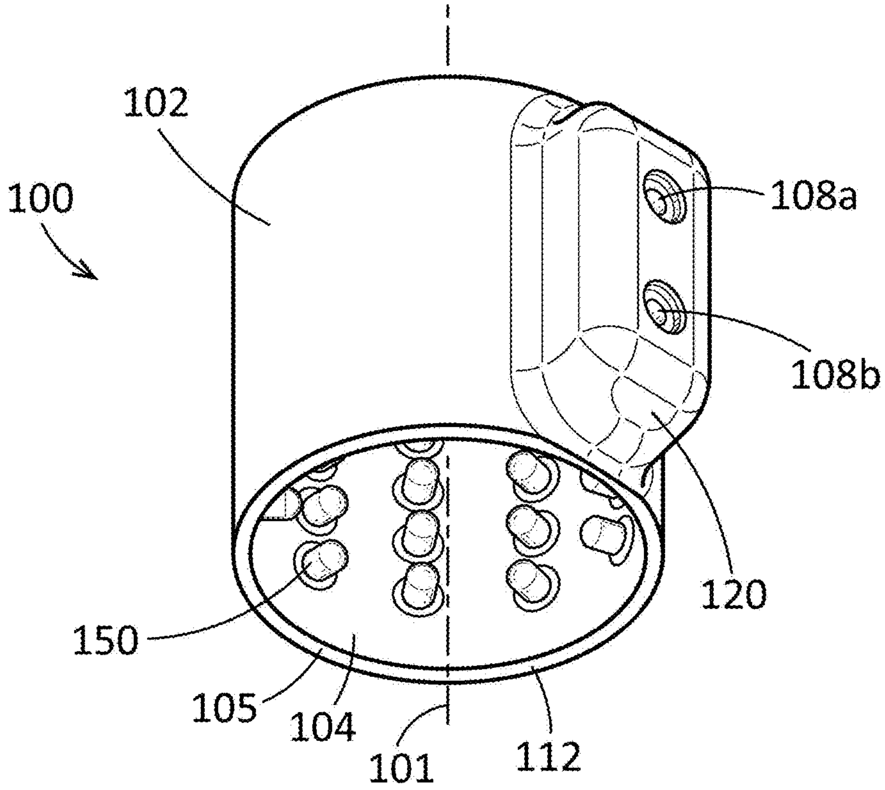
FIG. 1B is a front bottom left perspective view of the cigar holder of FIG. 1A.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint. With respect to a surface defining a particular shape, the surface can define such a shape "substantially" by defining the noted shape except for ridges, indentations, openings, surface texture, or other local deviations from such shape or except for draft angles or edge treatments such as, for example and without limitation, can facilitate manufacturing.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams. Unless otherwise specified herein, any structure disclosed in the drawings or in the written description as being so formed can be monolithic whether or not such an explicit description of the structure is included herein.

To simplify the description of various elements disclosed herein, the conventions of "left," "right," "front," "rear," "top," "bottom," "inside," and/or "outside," may be referenced. Unless stated otherwise, "front" describes that end of the cigar holder with either a protrusion extending from a surrounding portion of the outer surface or else that end of the cigar holder comprising a magnet; "rear" is that end of the cigar holder that is opposite or distal the front; "left" is that which is to the left of or facing left the front of the cigar holder; and "right" is that which is to the right of or facing right from the front of the cigar holder.

In one aspect, a cigar holder and associated methods, systems, devices, and various apparatuses are disclosed herein. In one aspect, the cigar holder can comprise a body, which can be an annular body and can define an inner surface and an outer surface. In one aspect, a protrusion can extend from the outer surface of the annular body or a surrounding portion thereof. In one aspect, a magnet can be coupled to and/or received within the annular body.

One aspect of a cigar holder 100 is disclosed and described in FIGS. 1A-1K. The cigar holder 100, which can be an object holder, can comprise a body 110. The body 110, which can define an axis 101, can be an annular body, including with any of the features and in any of the shapes disclosed herein. The cigar holder 100 can define an outer surface 102 and an inner surface 104. The cigar holder 100 can define a bottom surface 112 (shown in FIG. 1B) at a first end 105 of the cigar holder 100 and a top surface 114 at a second end 106 of the cigar holder 100. Each of the bottom surface 112 and the top surface 114 can extend from the inner surface 104 to the outer surface 102 of the body 110. A distance between the inner surface 104 and the outer surface 102 in a radial direction of the body 110 with respect to the axis 101 can define a wall thickness 172 (shown in FIG. 1C).

In some aspects, the outer surface 102 can be smooth. In some aspects, the outer surface can be rough, dimpled, or have ridges. In some aspects, a texture of the outer surface 102 can be any Mold-Tech texture, including Mold-Tech A, Mold-Tech B, Mold-Tech C, or Mold-Tech D. In some aspects, the texture can be MT-11020 or at least MT-11020, which can have a texture depth of approximately 0.0015 inches or the equivalent Ra value or average roughness value. In some aspects, the texture can be MT-11010 or at least MT-11010, which can have a texture depth of approximately 0.001 inches or the equivalent Ra value or average roughness value. In some aspects, the outer surface 102 can be contiguous. More specifically, either or both of the outer surface 102 and the inner surface 104 can define no holes between the first end 105 and the second end 106 of the cigar holder. In some aspects, the outer surface 102 can define one or more openings or, more specifically, one or more holes, slits, or channels, any of which can extend from the outer surface 102 to the inner surface 104. The body 110 can further define a protrusion 120, which can extend from a surrounding portion of the body 110. In some aspects, the wall thickness 172 of the body 110 in a radial direction with respect to the axis 101 of the cigar holder 100 and, more specifically, the body 110 can be thicker at the protrusion 120 than where the body 110 does not define the protrusion 120. In some aspects, the outer surface 102 can be substantially cylindrical—at least in part with the protrusion 120 and any draft angles not considered—and, more specifically, can define a circular shape in cross-section. In some aspects, the outer surface 102 can form a triangular shape, square shape, polygonal or substantially polygonal shape, and/or an ergonomic shape in cross-section.

In some aspects, the inner surface 104 can define a substantially cylindrical shape. Either or both of the outer surface 102 and the inner surface 104 can define a constant radius. The inner surface 104 can be contiguous or can define one or more holes, slits, or channels, which can extend from the inner surface 104 to the outer surface 102. The inner surface 104 of the body 110 can have or define the same (e.g., circular) shape in cross-section as the outer surface 102. In one aspect, the inner surface 104 can be substantially cylindrical and, more specifically, can define a circular shape in cross-section. In some aspects, the inner surface 104 can form a triangular shape, square shape, polygonal or substantially polygonal shapes or an ergonomic shape in cross-section. The inner surface 104 can have or define a first protuberance 150, which can extend from a surrounding portion of the inner surface 104. The inner surface 104 can have or define a second protuberance 150, which can also extend from a surrounding portion of the inner surface 104. The inner surface 104 can have or define a plurality of protuberances 150, each of which can be positioned between the bottom surface 112 or the first end and the top surface 114 or second end. Each of or any of the protuberances 150 can extend at least in part in a radial direction from the inner surface 104. As shown, the protuberances 150 and any other portion of the body 110 can be formed monolithically.

Figure 1C:
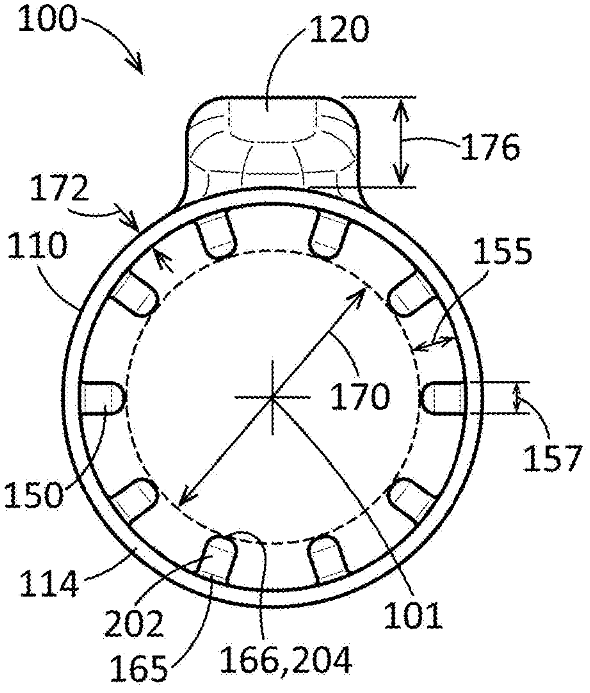
FIG. 1C is a bottom view or first end view of the cigar holder of FIG. 1A.
Figure 1D:
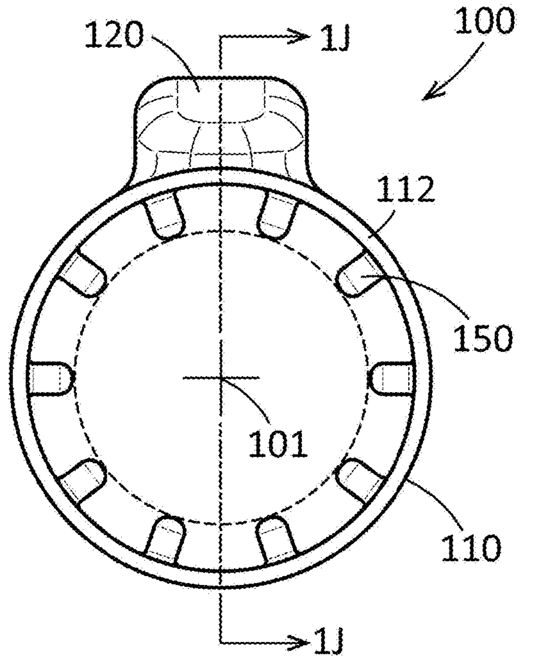
FIG. 1D is a top view or second end view of the cigar holder of FIG. 1A.
Figure 1E:
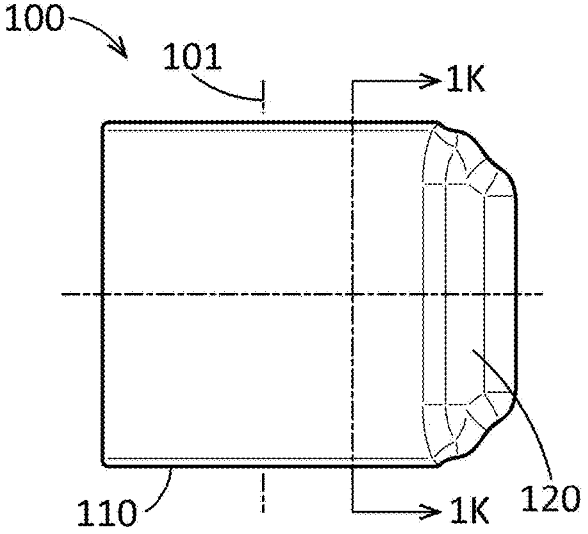
FIG. 1E is a left view of the cigar holder of FIG. 1A.
Figure 1F:
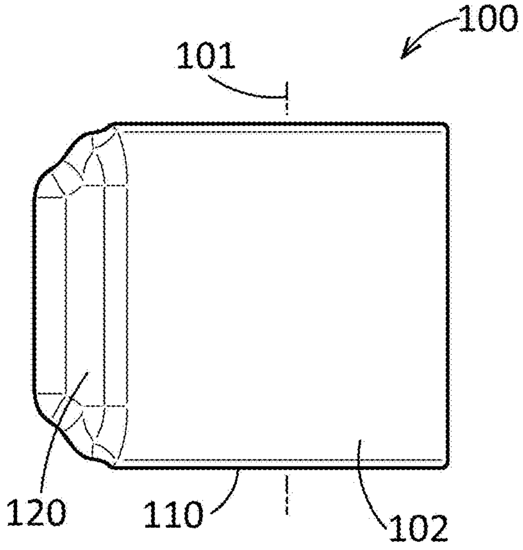
FIG. 1F is a right view of the cigar holder of FIG. 1A.

In some aspects, as shown in FIG. 1C, the inner surface 104 can define a diameter 170 and can receive or accommodate a cigar defining a ring gauge of 30 to 75, with the ring gauge being a diameter of the cigar measured in increments of 64ths of an inch. Accordingly, a cigar defining a ring gauge of 30 measures 30/64ths of an inch or at least nominally so. In some aspects, the inner surface 104 can receive or accommodate a cigar or other object that is less than 30 ring gauge or greater than 75 ring gauge. In some aspects, the diameter 170 can be less than the range of cigars (or other objects) intended to be received within the cigar holder—or just holder—100. As shown, the protrusion 120 can define a protrusion height 176, which can be measured in a radial direction of the cigar holder 100 with respect to the axis 101. In some aspects, the protrusion height 176 can measure less than or equal to five times the wall thickness 172 of the body.

In some aspects, as also shown in FIG. 1C, the protuberance 150 can comprise or define a substantially cylindrical surface or substantially cylindrical portion 202, which can extend from a surrounding portion of the inner surface 104. In some aspects, the protuberance 150 can comprise or define a cylindrical surface or a cylindrical portion 202. In some aspects, the protuberance 150 can be substantially cylindrical—at least in part with any draft angles not considered. In some aspects, the draft angle can be between 1 and 9 degrees and, more specifically, the draft angle can be 2 degrees. More specifically, the protuberance 150 can have a circular shape in cross-section. As also shown, the protuberance 150 can comprise or define a rounded portion 204. In some aspects, the protuberance 150 can be non-cylindrical and can define a non-circular shape in cross-section. More specifically, the protuberance 150 can define a polygonal shape in cross-section such as, for example and without limitation, a triangular or square shape. In some aspects, the protuberance 150 can define an irregular shape. In some aspects the protuberance 150 can be flexible or can return to its original shape when deformed. In some aspects the protuberance 150 can be rigid. In some aspects, as shown, the protuberance 150 can define a constant cross-section from a first end or base 165 defining a radially outermost portion of the protuberance 150 to a second end or tip 166 defining a radially innermost portion of the protuberance 150, at least when the rounded portion 204 defines the tip 166. In some aspects, the protuberance 150 can define a taper from the base 165 to the tip 166. In some aspects, the taper can be 1 degree per side for a total of 2 degrees of taper, 2 degrees per side for a total of 4 degrees of taper, or 3 degrees per side for a total of 6 degrees of taper.

The protuberance 150 can define a height 155. The protuberance 150 can define a diameter 157, which can be an average diameter or a median diameter (e.g., the diameter 157 at a midpoint of the protuberance). In some aspects, the height 155 can measure at least two times the wall thickness 172 of the body 110. More specifically, the height 155 can measure at least 2.5 times the wall thickness 172 of the body 110. In some aspects, the height 155 of a plurality of protuberances 150 can be constant among the plurality of protuberances 150. In some aspects, the height 155 of a plurality of protuberances 150 can vary among the plurality of protuberances 150. In some aspects, an aspect ratio of the height 155 to the diameter 157 can be at least 1:1. In some aspects, an aspect ratio of the height 155 to the diameter 157 can be at least 1:2. In some aspects, an aspect ratio of the height 155 to the diameter 157 can be at least 1:3. In some aspects, an aspect ratio of the height 155 to the diameter 157 can be at least 1:4.

In some aspects, the protuberance 150 or an axis thereof can be angled at 90 degrees with respect to the inner surface 104 of the body 110 or a tangent line intersecting the inner surface 104 at the protuberance 150 and thus can be perpendicular to the inner surface 104 or a tangent line intersecting the inner surface 104 at the protuberance 150. In some aspects, the protuberance 150 or an axis thereof can be angled at more than 90 degrees or less than 90 degrees with respect to the inner surface 104 of the body 110 or with respect to a tangent line intersecting the inner surface 104 at the protuberance 150.

In some aspects, the cigar holder 100 can comprise a plurality of protuberances 150. In some aspects, the plurality of protuberances 150 can be spaced evenly around the inner surface 104. In some aspects, the protuberances 150 can be arranged in rows within the inner surface or on a surrounding portion of the inner surface. In some aspects, the rows can be straight. In some aspects, the rows can be curved. In some aspects, the rows can be parallel relative to the axis 101. In some aspects, the protuberances 150 can be distributed in 10 rows, in which case adjacent rows of protuberances 150 can be spaced apart on the inner surface by 36 degrees in a circumferential direction. In some aspects, the protuberances 150 can be arranged in 3, 4, 5, 6, 7, 8, or 9 rows. In some aspects, the protuberances 150 can be arranged in at least any of the numbers of rows indicated. Each row of protuberances 150 can comprise two or more protuberances. In some aspects, as shown in FIGS. 1C and 1J, the inner surface 104 can define 10 rows of protuberances 150, which can comprise 5 protuberances 150 per row for a total of 50 protuberances 150 or at least 50 protuberances 150. In some aspects, the inner surface 104 can define at least 25 protuberances 150. In some aspects, the inner surface 104 can define at least 10 protuberances 150.

Where the cigar holder 100 comprises a plurality of protuberances 150, the cigar can be effectively suspended between multiple sets of opposing protuberances and can reach a position of natural equilibrium, in which case the same force can be applied by each protuberance 150 against the outside of the cigar. Because the force exerted by each protuberance 150 against the cigar can be relatively small given their size and the deformability of the material from which the cigar holder 100 and each protuberance 150 is formed, the risk of tearing of the cigar can be reduced or eliminated. In the case of the plurality of protuberances 150, that small force can be multiplied many times (e.g., an amount equal to the number of protuberances 150) and can be sufficient to resist movement of the cigar, even when the cigar is orientated vertically or otherwise not oriented horizontally. In some aspects, regular spacing between adjacent protuberances 150 or from an end of the cigar holder to a first protuberance 150 in each row of protuberances 150 can cause the insertion force to remain constant (i.e., smooth) as the cigar is inserted. The higher the quantity of protuberances 150, the lower the force by each protuberance 150 or the stronger the stronger the overall grip on the cigar, depending on whether you "weaken" each protuberance 150 or just keep of each protuberance 150 as-is (for example, as you increase the quantity).

Figure 1G:
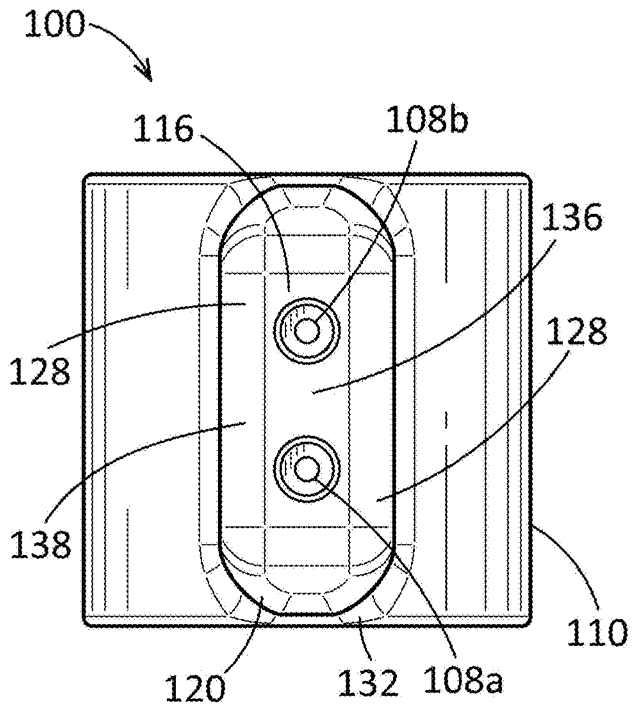
FIG. 1G is a front view of the cigar holder of FIG. 1A.
Figure 1H:
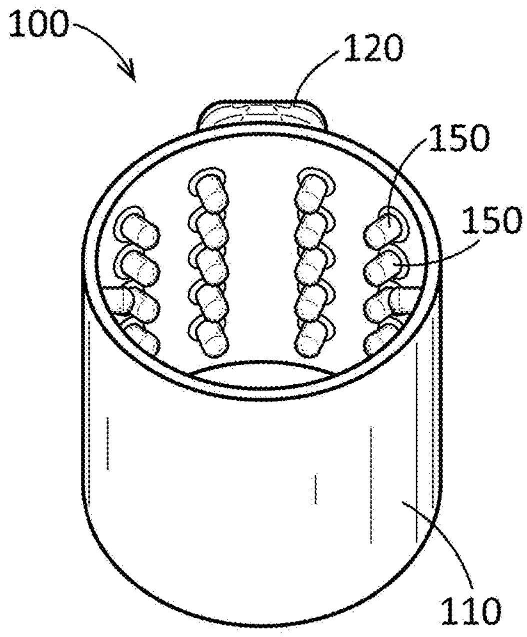
FIG. 1H is a top rear perspective view of the cigar holder of FIG. 1A.

As shown in FIG. 1G, the protrusion 120 can be disposed or defined on the front end of the cigar holder 100. The protrusion 120 can define one or more openings or apertures 108*a,b* on a surface 116 of the protrusion 120. More specifically, the protrusion 120 can define a first aperture 108*a* and a second aperture 108*b* on the surface 116 and, more specifically, a first portion or face portion 136 thereof, which can be a flat portion. In some aspects, as shown, the surface 116 can comprise a second portion or side portion 138, which can be connected to or extend from one or more sides of the face portion 136. The side portion 138 can comprise a flat portion 130 (shown in FIG. 1I). A curved portion 128 can connect or join the flat portion 130 to the face portion 136, and a curved portion 132 can connect or join a remaining portion of the side portion 138 (e.g., the flat portion 130) to the surrounding portion of the outer surface 102.

Figure 1I:
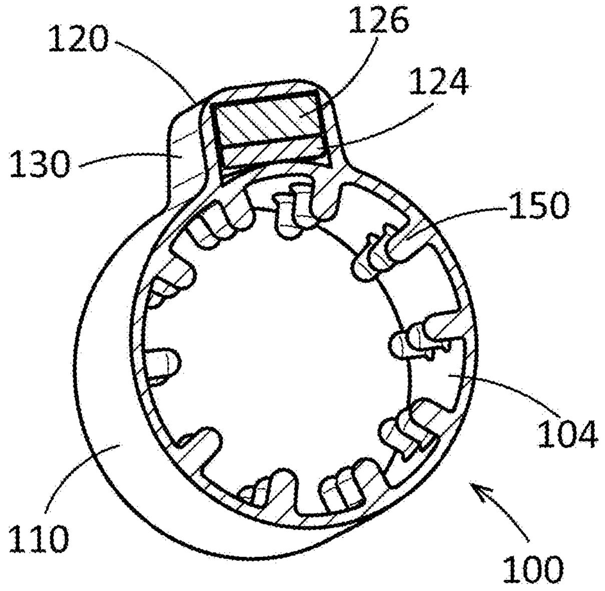
FIG. 1I is a sectional perspective view of the cigar holder of FIG. 1A taken along line 1I-1I of FIG. 1E.
Figure 1J:
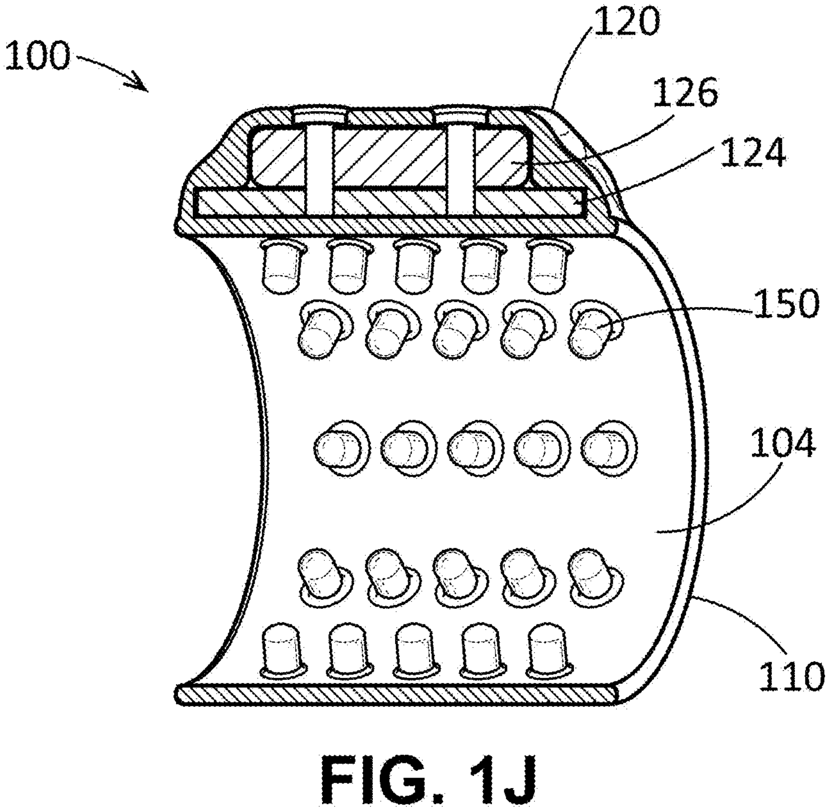
FIG. 1J is a sectional perspective view of the cigar holder of FIG. 1A taken along line 1J-1J of FIG. 1D.
Figure 1K:
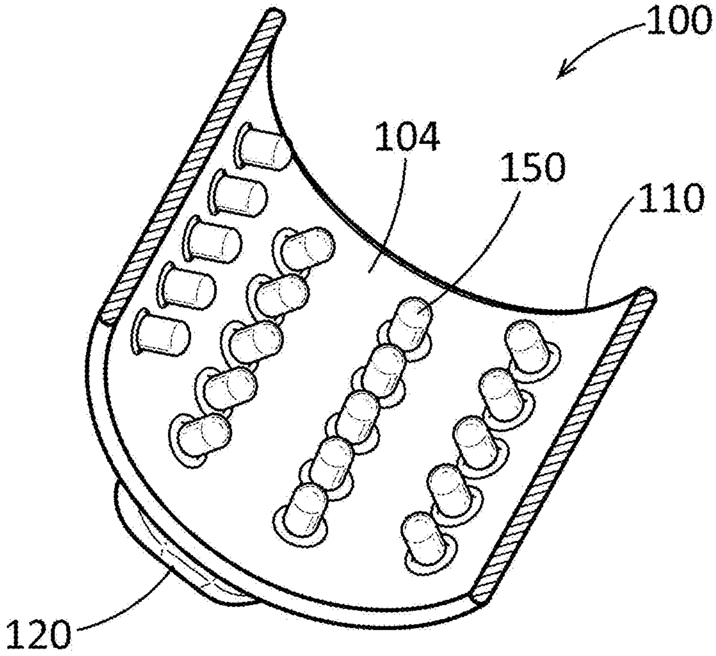
FIG. 1K is a sectional perspective view of the cigar holder of FIG. 1A taken along line 1K-1K of FIG. 1E.

As shown in FIG. 1I, the cigar holder 100 can comprise at least one of a plate 124 and a magnet 126. More specifically, the protrusion 120 can enclose at least one of the plate 124 and the magnet 126. In some aspects, the enclosure of the magnet 126 by the outer surface 102 of the protrusion 120 can couple the magnet 126 to a remaining portion of the body 110. In some aspects, the plate 124 can be disposed next to or adjacent to the magnet 126. In some aspects, the plate 124 can be in contact with the magnet 126. In some aspects, the plate 124 can comprise a ferrous material such as, for example and without limitation, iron or steel. In some aspects, the presence of the plate 124 can increase a strength of a magnetic field of the magnet 126. In some aspects, the magnet 126 can be coupled to the body 110 with a fastener or fastening material such as, for example and without limitation, an adhesive, a hook-and-loop fastener, or other means known to a person of ordinary skill in the art. In one aspect, the plate 124 can be disposed between the inner surface 104 and the magnet 126. In some aspects, the magnet 126 can comprise neodymium (Nd) and, more specifically, a neodymium alloy. In some aspects, the magnet 126 can be at least N52 grade. More specifically, the magnet 126 can be formed from or can comprise the neodymium alloy with a $Nd_2Fe_{14}B$ tetragonal crystalline structure. In some aspects, the magnet 126 can define a magnetization direction extending parallel to the axis 101.

Figure 2A:
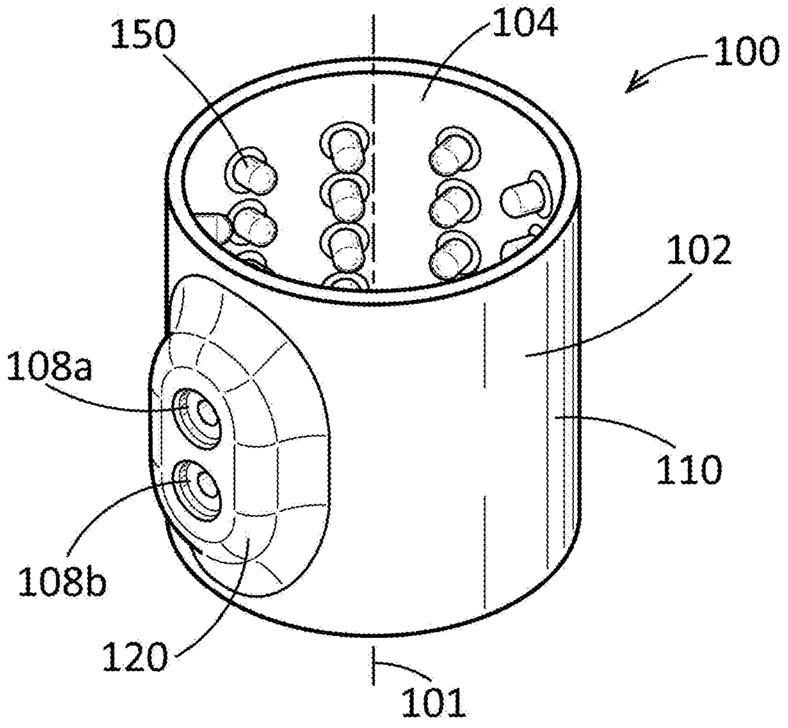
FIG. 2A is a front top right perspective view of a cigar holder in accordance with a second aspect of the current disclosure.
Figure 2B:
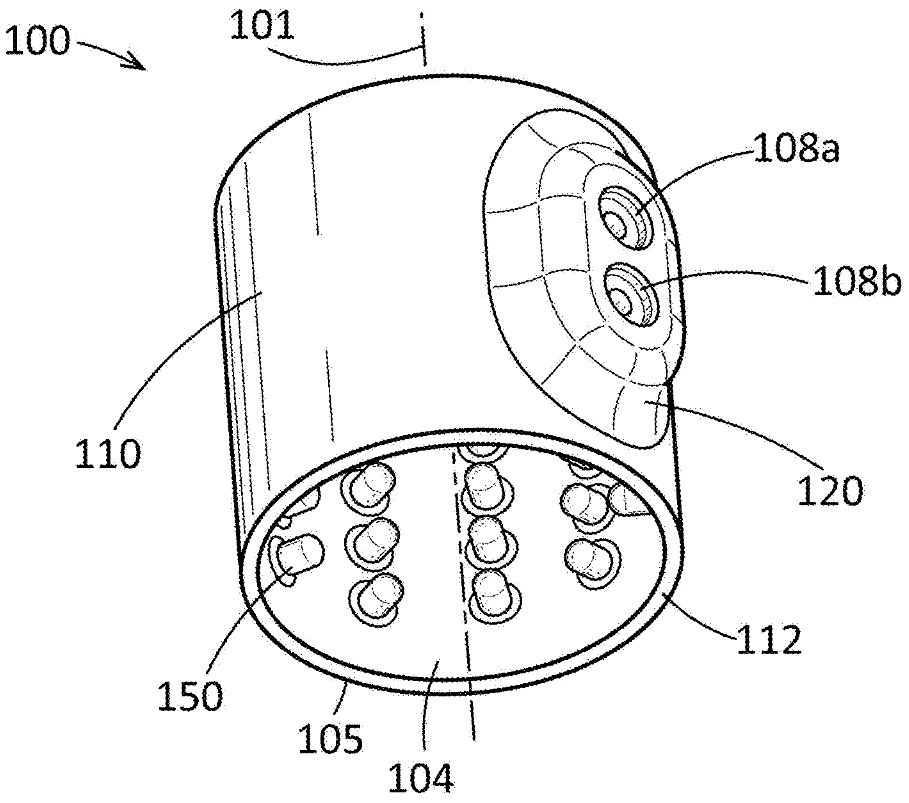
FIG. 2B is a front bottom left perspective view of the cigar holder of FIG. 2A.
Figure 2C:
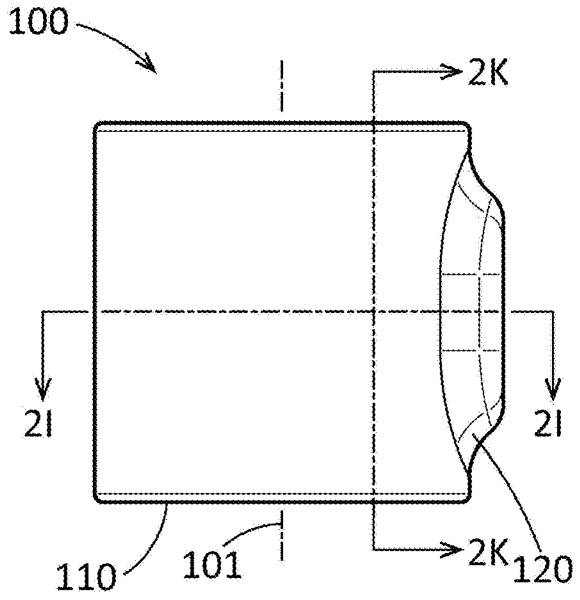
FIG. 2C is a left view of the cigar holder of FIG. 2A.
Figure 2D:
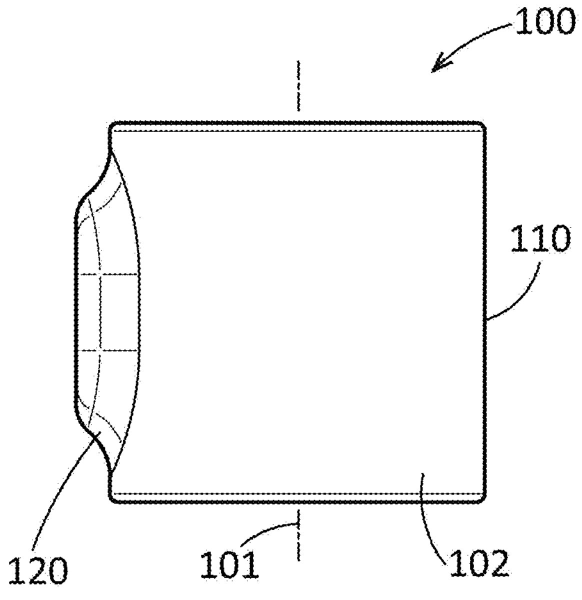
FIG. 2D is a right view of the cigar holder of FIG. 2A.
Figure 2E:
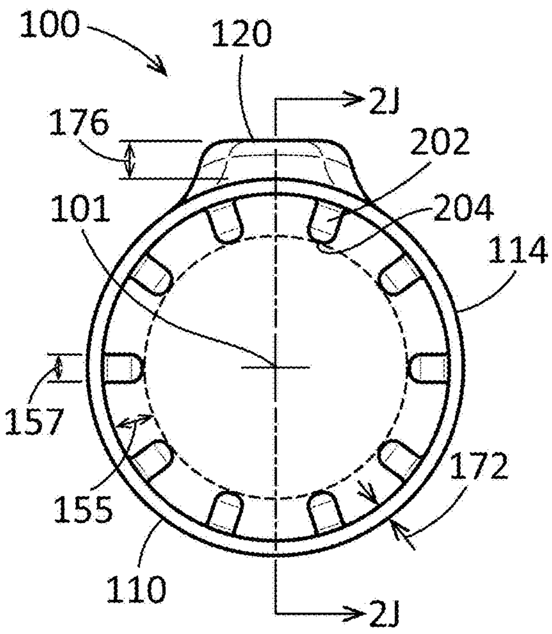
FIG. 2E is a bottom view or first end view of the cigar holder of FIG. 2A.
Figure 2F:
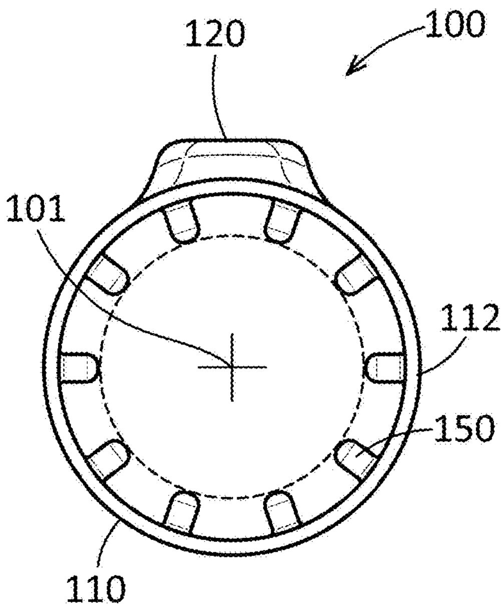
FIG. 2F is a top view or second end view of the cigar holder of FIG. 2A.

A second aspect of the cigar holder 100 is disclosed and described in FIGS. 2A-2K. As shown, in comparison to how the protrusion 120 is shown in FIG. 1C, the protrusion 120 can protrude less from a surrounding portion of the body 110 and, more specifically, the outer surface 102 thereof. In some aspects, as shown in FIG. 2E, the protrusion height 176 can measure less than or equal to three times a minimum wall thickness or wall thickness 172 of the body. In some aspects, the protrusion height 176 can measure less than or equal to two times the wall thickness 172 of the body. In some aspects in which the wall thickness 172 is greater and/or the protrusion height 176 is shortened or even eliminated, the wall thickness 172 can be constant about the entire circumference of the cigar holder 100.

Figure 2G:
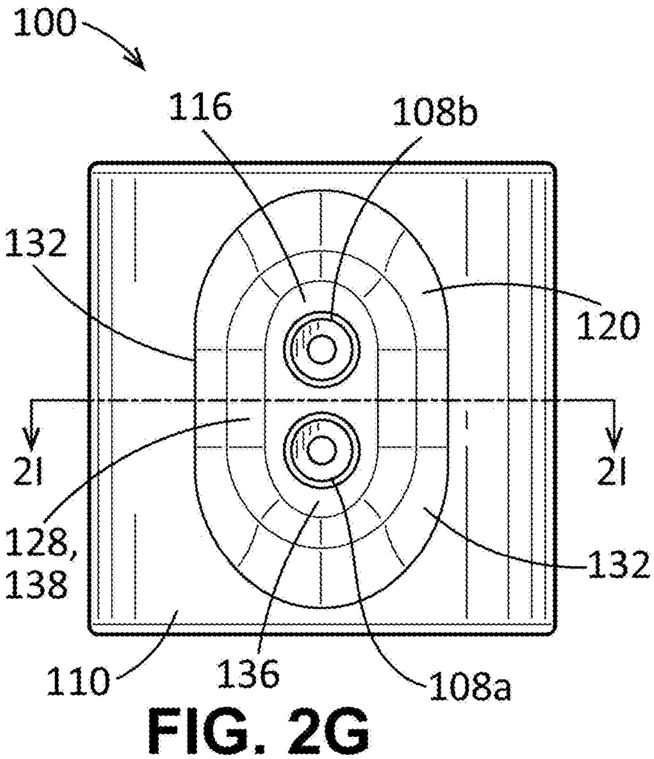
FIG. 2G is a front view of the cigar holder of FIG. 2A.
Figure 2H:
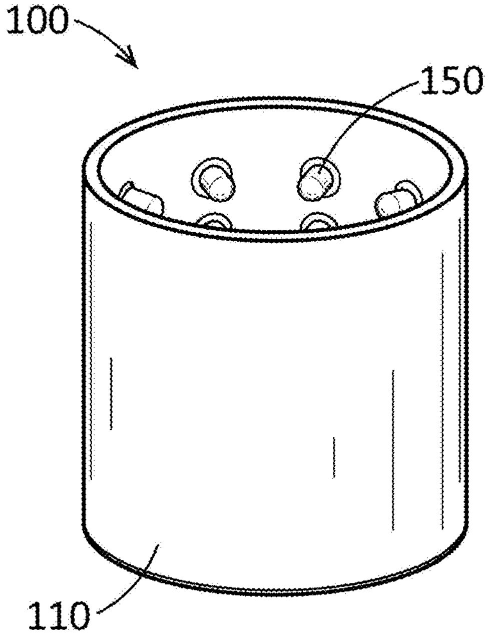
FIG. 2H is a rear perspective view of the cigar holder of FIG. 2A.
Figure 2I:
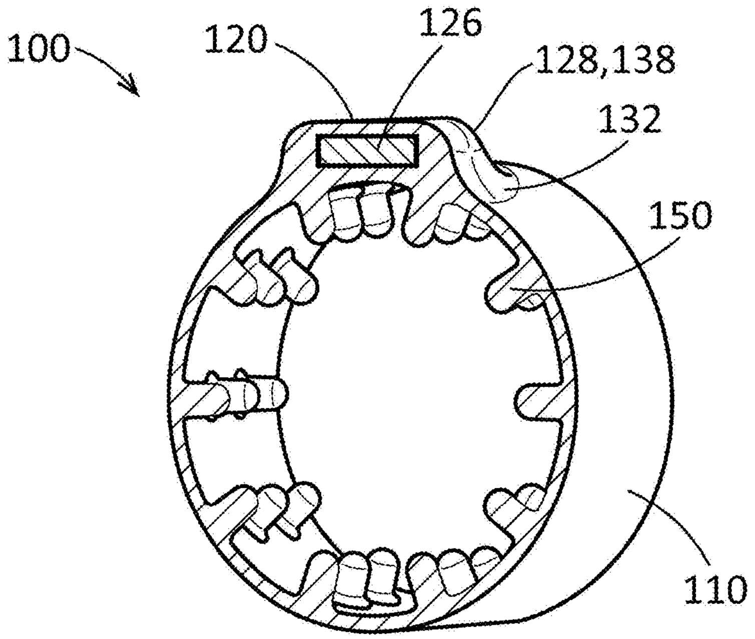
FIG. 2I is a sectional view cut of the cigar holder of FIG. 2A taken along line 2I-2I of FIG. 2G.

As shown in FIG. 2G, the side portion 138 of the protrusion 120 can comprise a first curved portion 128, which can connect or join to one or more sides of the face portion 136; and a second curved portion 132, which can connect a remaining portion of the side portion 138 (e.g., the first curved portion 128) to the surrounding portion of the outer surface 102. As shown in FIG. 2I, the cigar holder 100 need not comprise and, more specifically, the protrusion 120 need not enclose the plate 124 but rather can enclose only the magnet 126. The enclosure of the magnet 126 by the outer surface 102 of the protrusion 120 and, more generally, the body 110 can be what couples the magnet 126 to the body 110.

A third aspect of a cigar holder 100 is disclosed and described in FIGS. 3A-3K. The outer surface 102 can define one or more openings 380, each of which can be a hole, slit, or channel. In some aspects, as shown, the outer surface 102 can define one or more of a first opening 380*a*, a second opening 380*b*, a third opening 380*c*, and a fourth opening 380*d*. The one or more of the openings 380*a,b,c,d* can extend from the outer surface 102 to the inner surface 104. The first opening 380*a* and second opening 380*b* can be disposed on the right side of the outer surface 102 and the third opening 380*c* and the fourth opening 380*d* can be disposed on the left side of the outer surface 102. As shown, one or more of the openings 380*a,b,c,d* can define a first or major dimension in a circumferential direction of the annular body that is greater than a second or minor dimension in an axial direction of the annular body with respect to the axis 101. As shown, the cigar holder need not have any of the protuberances 150 (shown in FIGS. 1A and 2A).

Figure 3A:
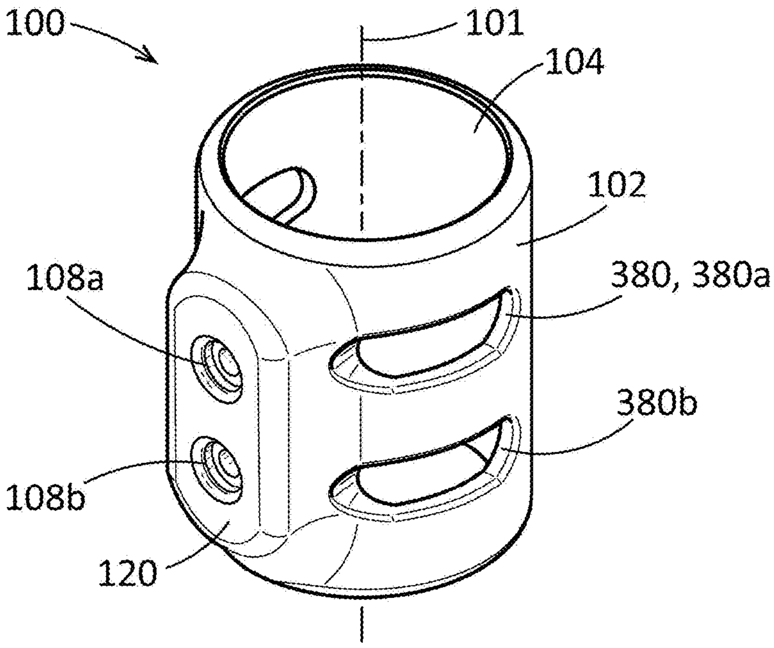
FIG. 3A is a front top right perspective view of a cigar holder in accordance with a third aspect of the current disclosure.
Figure 3B:
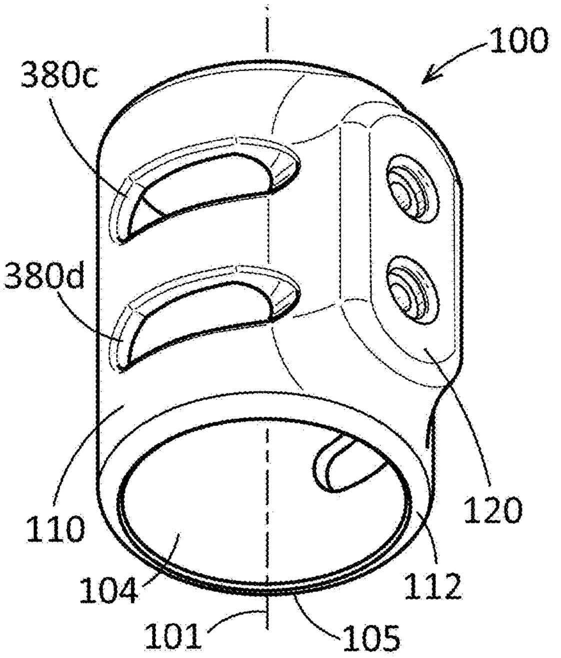
FIG. 3B is a front bottom left perspective view of the cigar holder of FIG. 3A.
Figure 3C:
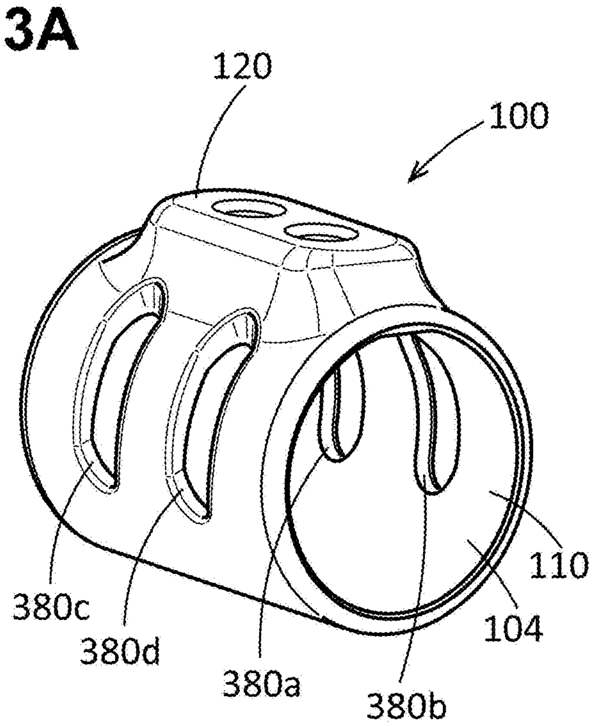
FIG. 3C is a left perspective view of the cigar holder of FIG. 3A.
Figure 3D:
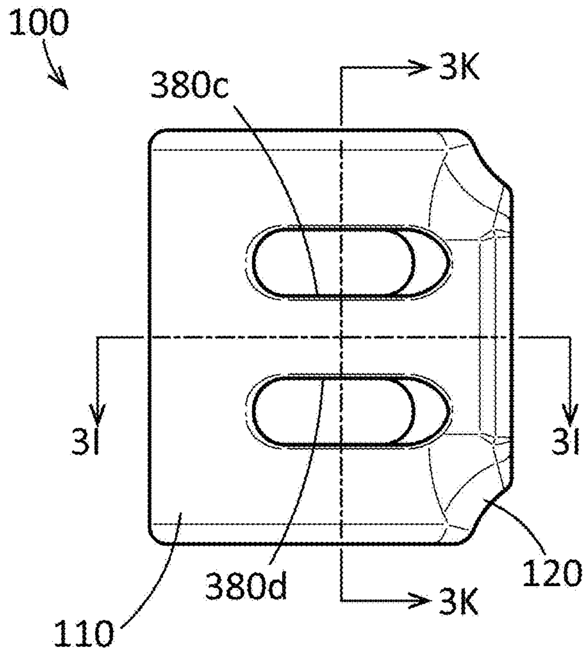
FIG. 3D is a left view of the cigar holder of FIG. 3A.
Figure 3E:
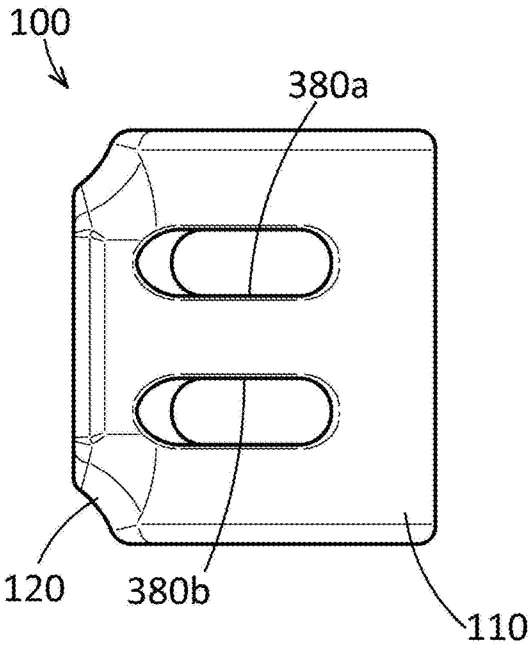
FIG. 3E is a right view of the cigar holder of FIG. 3A.
Figure 3F:
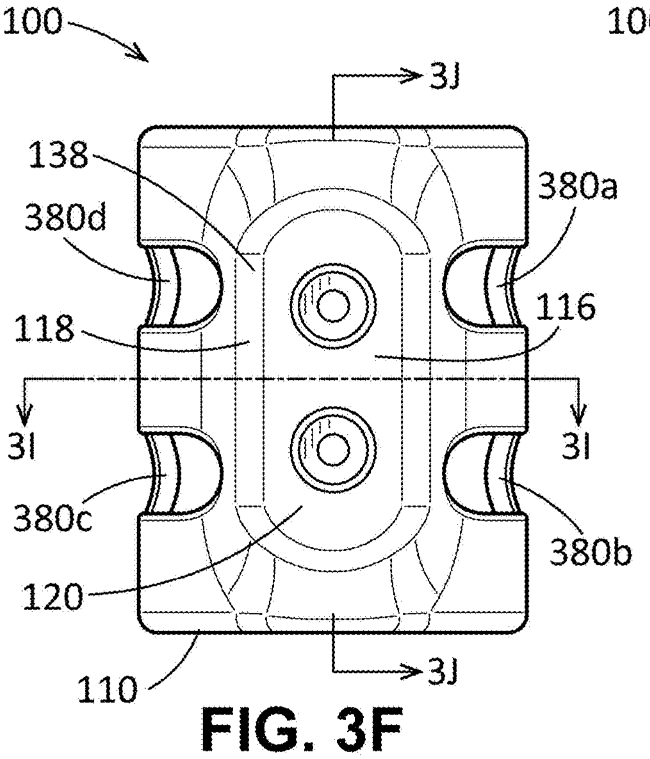
FIG. 3F is a front view of the cigar holder of FIG. 3A.
Figure 3G:
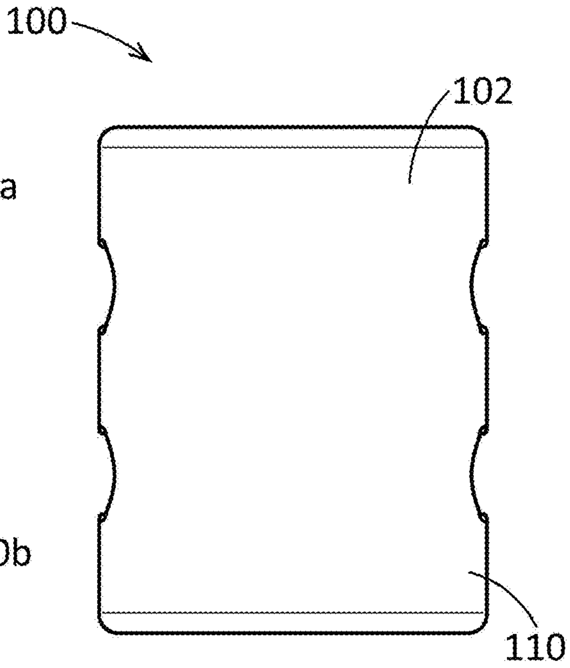
FIG. 3G is a rear view the cigar holder of FIG. 3A.
Figure 3H:
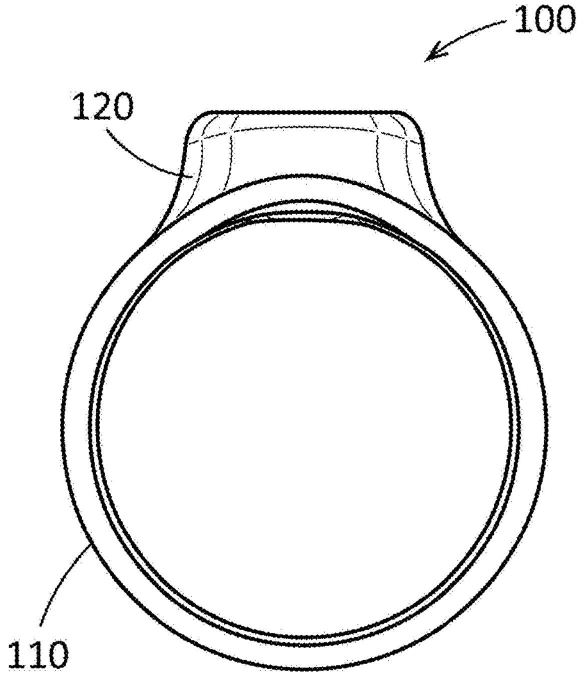
FIG. 3H is an end view of the cigar holder of FIG. 3A.

As shown in FIG. 3F, the side portion 138 of the protrusion 120 can comprise a portion 118 of the side portion 138, which can be connected to each side of the surface 116 and to the outer surface 102.

Figure 3I:
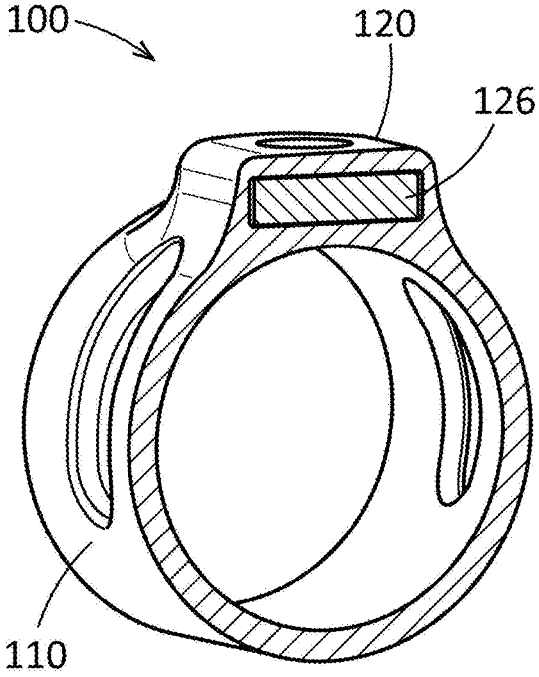
FIG. 3I is a sectional view the cigar holder of FIG. 3A taken along line 3I-3I of FIG. 3F.
Figure 3J:
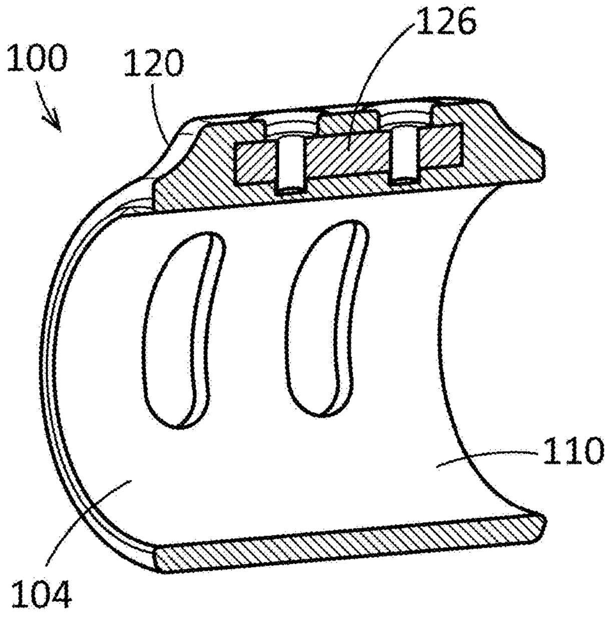
FIG. 3J is a sectional view the cigar holder of FIG. 3A taken along line 3J-3J of FIG. 3F.
Figure 3K:
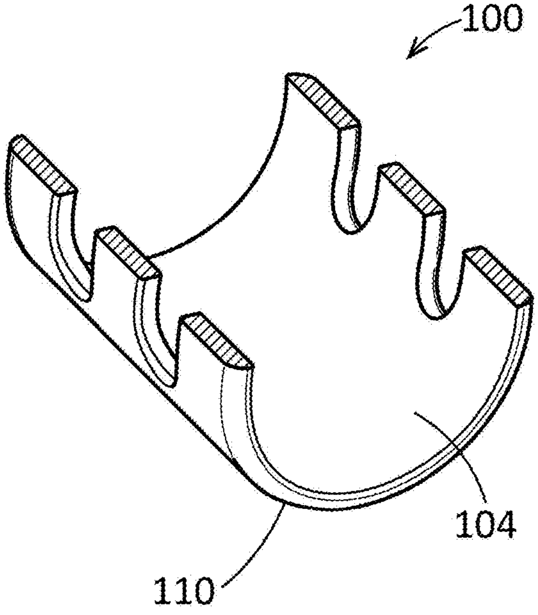
FIG. 3K is a sectional view the cigar holder of FIG. 3A taken along line 3K-3K of FIG. 3D.

As shown in FIG. 3I, the protrusion 120 can enclose the magnet 126. The enclosure of the magnet 126 by the outer surface 102 of the protrusion 120 and, more generally, the body 110 can be what couples the magnet 126 to the body 110.

Figure 4:
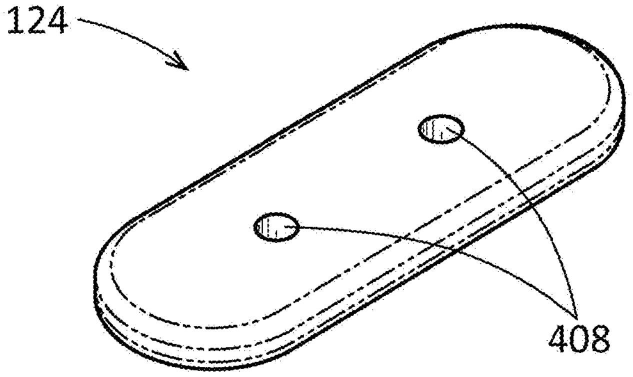
FIG. 4 is a perspective view of a plate of the cigar holder of FIG. 1A.

FIG. 4 is a perspective view of the plate 124 of the cigar holder 100 of FIG. 1A. The plate 124 can define a length (long direction), a width (short direction), and a thickness. In some aspects, as shown, the plate 124 can define a stadium shape in a top plan view. In some aspects, the plate 124 can define a polygonal or other shape in the top plan view. In some aspects, as shown, one or more edges of the plate 124 can be define an edge treatment such as, for example and without limitation, a radius or a chamfer. In some aspects, one or more edges of the plate 124 can define a sharp edge. In some aspects, one or more edges of the plate 124 can intersect at a 90-degree angle. The plate 124 can define one or more openings or holes 408, which can be configured to receive corresponding structure such as, for example and without limitation, a pin for locating a fixing or maintaining a position of the plate 124 during molding of the cigar holder 100.

Figure 5:
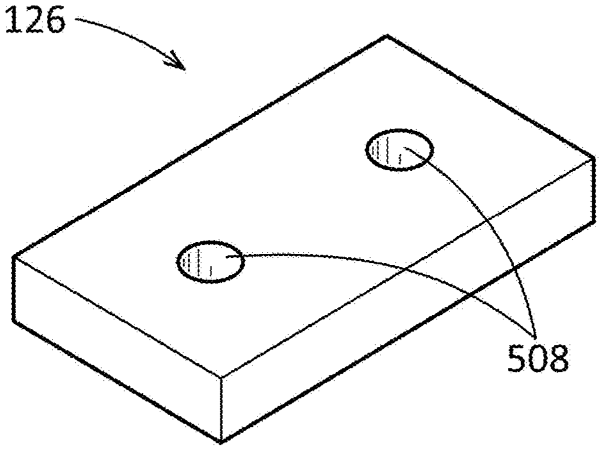
FIG. 5 is perspective view of a magnet of the cigar holder of FIG. 2A.
Figure 6:
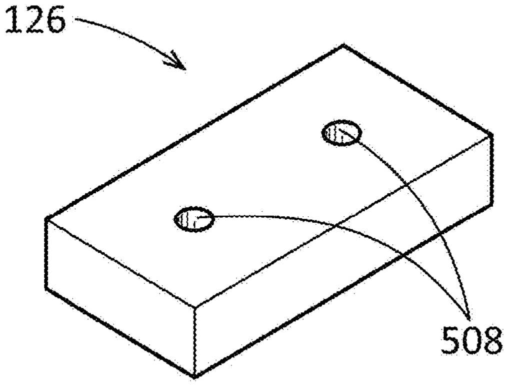
FIG. 6 is perspective view of a magnet of the cigar holder of FIG. 1A.

FIG. 5 is a perspective view of a magnet 126 of the cigar holder 100 of FIG. 2A, and FIG. 6 is a perspective view of a magnet 126 of the cigar holder 100 of FIG. 1A. The magnet 126 can define a length (long direction), a width (short direction), and a thickness. In some aspects, as shown, the magnet 126 can define a rectangular shape in a top plan view. In some aspects, as shown, the magnet 126 can define a polygonal or other shape in the top plan view. In some aspects, as shown, one or more edges of the magnet 126 can define a sharp edge. In some aspects, one or more edges of the magnet 126 can be define an edge treatment such as, for example and without limitation, a radius or a chamfer. In some aspects, one or more edges of the magnet 126 can intersect at a 90-degree angle. As shown, the magnet 126 can define one or more openings or holes 508, which can be configured to receive corresponding structure such as, for example and without limitation, a pin for locating a fixing or maintaining a position of the magnet 126 during molding of the cigar holder 100.

Figure 7:
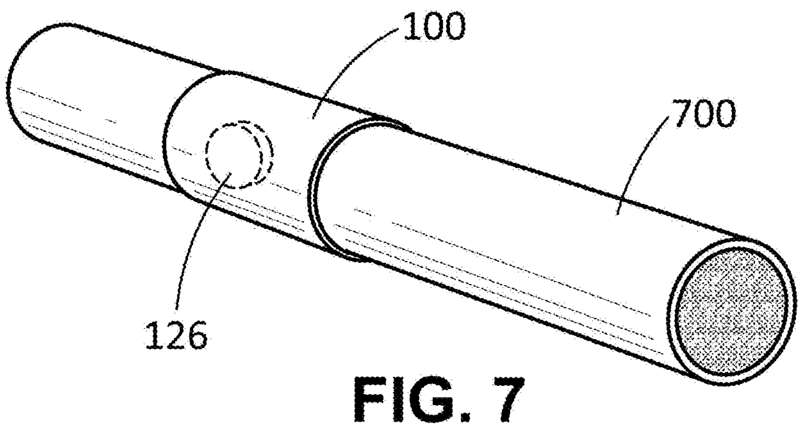
FIG. 7 is a perspective view of a cigar received within the cigar holder of FIG. 1A in accordance with another aspect of the current disclosure.

FIG. 7 is a perspective view of a cigar 700 received within the cigar holder 100 of FIG. 1A in accordance with another aspect of the current disclosure. In some aspects, as shown, the cigar holder 100 need not define the protrusion 120 but can still comprise the magnet 126.

Figure 2J:
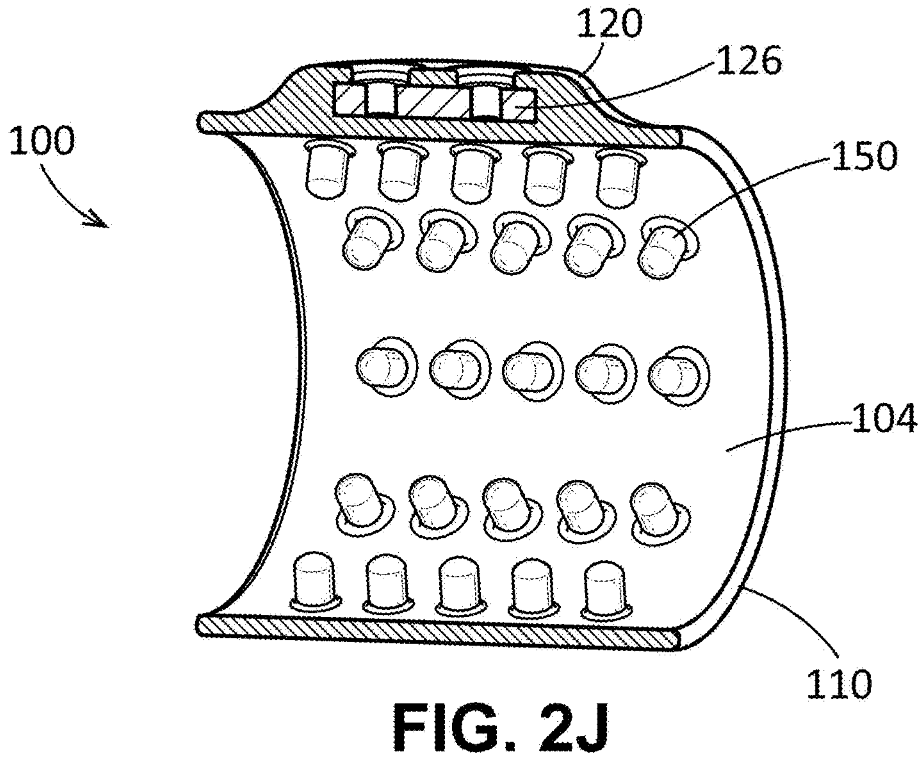
FIG. 2J is a sectional view of the cigar holder of FIG. 2A taken along line 2J-2J of FIG. 2E.
Figure 2K:
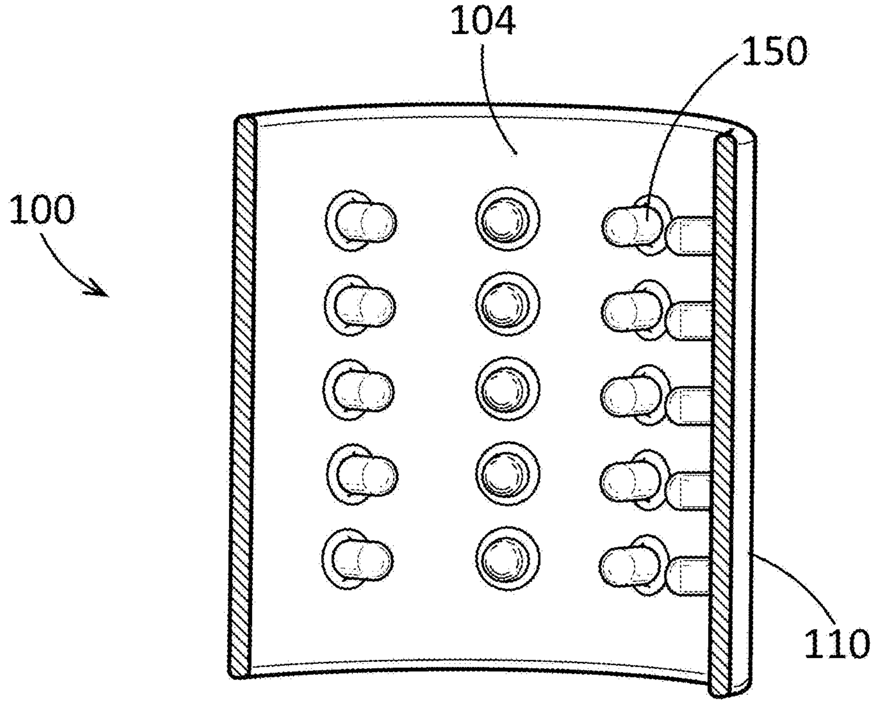
FIG. 2K is a sectional view of the cigar holder of FIG. 2A taken along line 2K-2K of FIG. 2C.
Figure 8:
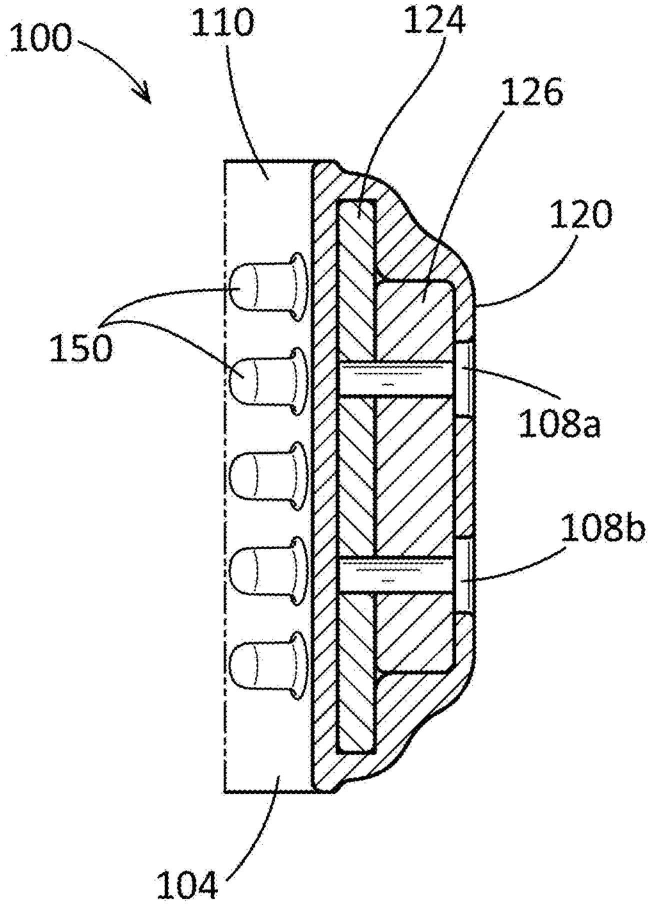
FIG. 8 is a partial sectional view of the cigar holder of FIG. 1J.
Figure 9:
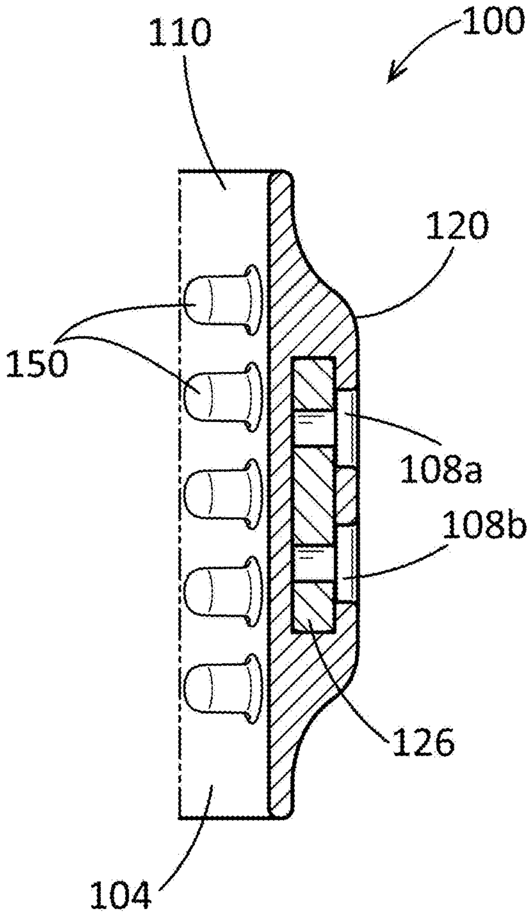
FIG. 9 is a partial sectional view of the cigar holder of FIG. 2J.

FIG. 8 is a partial sectional view of the cigar holder 100 of FIG. 1J, and FIG. 9 is a partial sectional view of the cigar holder 100 of FIG. 2J.

The cigar holder 100 can be formed from a flexible material and, more specifically, an elastic or resilient material that returns to its original shape upon removal of the force stretching the material. More specifically, the cigar holder 100 can be stretched around the cigar, and the inner surface 104 can contact the cigar when the cigar holder 100 is allowed to contract or return to its unstretched condition.

The protuberance 150 can be of any shape or material able to or configured to grab a cigar and frictionally secure the cigar within the inner surface 104 of the cigar holder 100 or otherwise maintain an axial position of the cigar with respect to the cigar holder 100. The protuberance 150 can be a flap, triangular shaped, or rod shaped. The protuberance 150 can be made of a flexible material such that the friction from the protuberance 150 does not scrape or rub off any portion of the outside layer of the cigar, which can be delicate.

A method of using the cigar holder 100 can comprise inserting the cigar into the cigar holder 100. The method can comprise frictionally holding the cigar within the body 110 with the protuberances 150. More specifically, the method can comprise frictionally holding the cigar within the body 110 with the protuberances 150. Again, the radially innermost tip of the protuberances 150 can define or accommodate a ring gauge of 30 to 75.

More specifically, the method of using the cigar holder 100 can comprise inserting the cigar, a diameter or ring gauge of which can be within a range predetermined for the cigar holder 100, through the body 110 in a first direction. In some aspects, the method can comprise flexing the one or more protuberances 150 of the cigar holder 100 in the first direction, which can be a direction of insertion. Because the force exerted by each protuberance against the cigar is relatively small, the risk of tearing of the cigar is reduced or eliminated. Upon insertion of the cigar and flexing of the protuberance 150, the method can comprise the one or more protuberances 150, each of which can comprise a resilient material with a memory, naturally tending to return to their original orientation and thereby applying a force to the outside of the cigar. The method can comprise moving or translating (e.g., by pushing or pulling) the cigar further in the first direction. More specifically, the method can comprise moving the cigar in an axial direction with sufficient force to overcome the force applied by the one or more protuberances 150. The method can comprise moving the cigar relative to the cigar holder 100 in a second direction, which can be opposite from or against the direction of insertion.

More specifically, the method can comprise unflexing or unbending the one or more protuberances 150 and/or flexing or bending the one or more protuberances 150 in the second direction. In some aspects, the one or more protuberances 150 can be rigid and inflexible. In some aspects the one or more protuberances can secure the cigar via friction between the protuberance 150 and the outside of the cigar. The protuberances 150 can have a flexibility and hold the cigar in place, but the frictional forces between the one or more protuberances and the cigar can be insufficient to tear or break the outer tobacco leaves or paper of the cigar.

The cigar holder 100 can be made of or can comprise a flexible material and deformable but can be able to return to its original shape. The cigar holder 100 can be used by stretching the body 110 to increase the diameter of the inner surface 104 and inserting a cigar that is the proper ring gauge through the body 110 in the first direction. The inner surface 104 can then return to its original smaller diameter and hold the cigar through frictional forces between the outer surface of the cigar and inner surface 104 of the body 110. The openings 380*a,b,c,d*, can increase grip-ability of the outer surface 102 of the body 110 by increasing the friction between a user's fingers and the cigar holder, and be ergonomic or placed to substantially form to a user's fingers as they grip the cigar holder 100.

The magnet 126 can be used to removably fasten the cigar holder to a magnetic surface. Once a cigar is inserted into the cigar holder 100, the protrusion 120 can be placed near any magnetic surface at the angle desired to continue smoldering the cigar. In other embodiments, the protrusion 120 or magnet 126 can be replaced by a clip, adhesive, or other temporary coupling.

The body 110 of the cigar holder 100 and, more generally, the cigar holder 100 can be formed from an elastomeric material, fabric, metal, rigid polymer, plastic, or other similar materials. The elastomeric material can be or can comprise, for example and without limitation, silicone, rubber, silicone rubber, thermoplastic vulcanizate (TPV), TPE, HTPE, or TPM or another elastomeric material. The elastomeric material can be adapted to receive an object that is non-cylindrical or compressible. In some aspects, a Shore A hardness of the body 110 can be between 20 and 30. In some aspects, a Shore A hardness of the body 110 can be equal to or less than 30. In some aspects, a Shore A hardness of the body 110 can be equal to or less than 20. In some aspects, the material of the body 110 can be flame resistant (UL 94 HB) or FDA compliant (21 CRR 177.2600/NSF ANS 51).

In some aspects, an elastomeric material forming the cigar holder 100 or a portion thereof can have a compression set of 40% or less using the ASTM D-395B method (at 158° F. or 70° C. for the standard test period of 22 hours). In some aspects, the material forming the cigar holder 100 or a portion thereof can have a compression set of 50% or less under the same conditions.

A method of forming the cigar holder 100 can comprise an overmolding process. In some aspects, the cigar holder 100 can comprise an elastomeric material on the inner surface 104 and more rigid material on the outer surface 102. In some aspects, the cigar holder 100 can comprise an elastomeric material on an interior portion of the cigar holder 100 or any portion thereof that is not visible when viewing of the inner surface 104 or the outer surface 102 and can comprise a more rigid material on each of the inner surface 104 and the outer surface 102. An elastomeric material can be stretchable, which means that the material is elastically (temporarily) deformable and will return to its original shape upon removal of the load causing the elastic deformation. In some aspects, the overmolding process can comprise injection molding. In some aspects, the method can comprise casting, three-dimensionally printing, or forming by any other ordinary process of making elastomeric objects. The openings 108*a,b* can be indicative of contacts for injection apparatus used in an overmolding process. More specifically, a portion of the mold can maintain a position of the magnet 126 and/or the plate 124 as the material forming the body 110 is injected into the mold and caused to flow throughout the mold. As such, in an overmolding process, the substrate can be the magnet 126, the plate 124, or both the magnet 126 and the plate 124.

Any feature described herein such as, for example and without limitation, the body 110, the protrusion 120, the protuberances 150, and other components of the cigar holder 100 and their arrangement, can comprise both functional and aesthetic elements, and any feature described as having functional aspects can have or define any one of several aesthetic designs without altering the respective parts' functions. If aesthetic elements are shown in the drawings or possibly fall within the scope of broader claim elements without being directly claimed, such disclosure or claims should not be interpreted as assigning any function to such aesthetic elements which may therefore be separately protectable.

With respect to any design protection that may separately arise from the instant disclosure, the right to shown in broken lines or otherwise disclaim any features disclosed in the figures is reserved. The right to disclaim any interior portion, individual edge, facet, radius of curvature, depression, indentation, protrusion, surface, feature or side of any design or a combination thereof disclosed in the figures is disclaimed. The right to interpret any side as including or excluding any rounded or beveled edge and to interpret the side to begin or end at the beginning or ending of the radius of curvature or bevel or at any point along the radius of curvature or bevel including, for example, the midpoint is reserved. The right to claim the overall appearance or any and all parts, portions, elements and/or combinations thereof is reserved. The right to replace any solid line with a broken line and to replace any broken line with a solid line is reserved. A set of break lines can divide the cigar holder 100 into eight equally thick axial sections with respect to the axis 101, and any two break lines thereof can be replaced with a pair of break lines can thereby indicate that, for design claiming purposes, the overall design or portions thereof are of indeterminate length. Any surface or portion of the surface can be represented with shading as exemplarily shown in U.S. Design Pat. No. D526,178 or with stippling as exemplarily shown in U.S. Design Pat. No. D190,563.

One should note that conditional language, such as, among others, "can," "could," "might," or "may," unless expressly stated otherwise, or otherwise understood within the context as used, is generally intended to convey that certain aspects include, while other aspects do not include, certain features, elements, and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

That which is claimed is:

1. A cigar holder comprising:

a monolithic annular body defining an inner surface and an outer surface and formed from an elastomeric material; the annular body comprising:

a protrusion extending outward in a radial direction from a surrounding portion of the outer surface with respect to an axis of the annular body; and a plurality of protuberances, each of the plurality of protuberances extending inward in a radial direction from a surrounding portion of the inner surface with respect to the axis of the annular body, each of the plurality of protuberances able to return to its original shape after being bent during use; and a magnet coupled to the annular body by being received within a portion of the annular body defining the protrusion, the portion extending from the inner surface to the outer surface, the magnet configured to secure the cigar holder to a surface of a structure that is separate from the cigar holder.

2. The cigar holder of claim 1, further comprising a plate disposed next to the magnet and in contact with the magnet, the plate being coupled to the annular body by enclosure within the annular body, the plate increasing a strength of a magnetic field of the magnet.

3. The cigar holder of claim 1, wherein each of the plurality of protuberances defines a circular cross-section and extends from the surrounding portion of the inner surface, an axis of the each of the plurality of protuberances being angled with respect to the surrounding portion of the inner surface of the annular body.

4. The cigar holder of claim 1, wherein an axis of each of the plurality of protuberances is perpendicular to the surrounding portion of the inner surface or a tangent line intersecting the surrounding portion of the inner surface.

5. The cigar holder of claim 1, wherein a height of the plurality of protuberances is constant among the plurality of protuberances.

6. The cigar holder of claim 1, wherein the plurality of protuberances comprises at least 25 protuberances spaced apart on the inner surface in rows, the rows spaced apart in a circumferential direction.

7. The cigar holder of claim 6, wherein the magnet comprises a neodymium alloy.

8. The cigar holder of claim 6, wherein an inner diameter defined by radially innermost portions of the plurality of protuberances is sized to receive a cigar defining a ring gauge of at least 30 and at most 75.

9. The cigar holder of claim 6, wherein the magnet comprises a neodymium alloy.

10. The cigar holder of claim 6, wherein an inner diameter defined by radially innermost portions of the plurality of protuberances is sized to receive a cigar defining a ring gauge of at least 30 and at most 75.

11. The cigar holder of claim 1, wherein the protrusion defines a protrusion height measuring less than or equal to two times a maximum wall thickness of a portion of the annular body not defining the protrusion.

12. The cigar holder of claim 11, wherein the protrusion defines an opening therein aligned with an opening defined in the magnet.

13. The cigar holder of claim 11, wherein the protrusion defines an opening therein aligned with an opening defined in the magnet.

14. The cigar holder of claim 1, wherein a Shore A hardness of the elastomeric material being equal to or less than 30.

15. The cigar holder of claim 1, wherein each of the plurality of protuberances defines a circular cross-section and extends from the surrounding portion of the inner surface, an axis of the each of the plurality of protuberances being angled with respect to the surrounding portion of the inner surface of the annular body.

16. The cigar holder of claim 1, wherein an axis of each of the plurality of protuberances is perpendicular to the surrounding portion of the inner surface or a tangent line intersecting the surrounding portion of the inner surface.

17. The cigar holder of claim 1, wherein an aspect ratio of a height to a diameter of each of the plurality of protuberances is at least 1:1.

18. The cigar holder of claim 1, wherein the plurality of protuberances comprises at least 25 protuberances spaced apart on the inner surface in rows, the rows spaced apart in a circumferential direction.

19. A cigar holder comprising:

an annular body defining an inner surface and an outer surface; the annular body comprising:

a protrusion extending outward in a radial direction from a surrounding portion of the outer surface with respect to an axis of the annular body; and a plurality of protuberances, each of the plurality of protuberances extending inward in a radial direction from a surrounding portion of the inner surface with respect to the axis of the annular body, each of the plurality of protuberances being flexible and able to return to its original shape after being bent during use, each of the plurality of protuberances being formed from an elastomeric material defining one of a) a compression set of 50% or less, as measured according to ASTM D-395B (22 hours @ 158° F.) and b) a Shore A hardness of less than 30; and a magnet coupled to the annular body by being received within a portion of the annular body defining the protrusion, the portion extending from the inner surface to the outer surface, the magnet configured to secure the cigar holder to a surface of a structure that is separate from the cigar holder.

20. A cigar holder comprising:

a monolithic annular body defining an inner surface and outer surface and formed from an elastomeric material, the inner surface defining a diameter sized to receive a cigar therein, the cigar defining a ring gauge of at least 30 and at most 75, the annular body comprising a protrusion extending in a radial direction from a surrounding portion of the outer surface of the annular body with respect to an axis of the annular body, the protrusion defining a protrusion height measuring less than or equal to two times a maximum wall thickness of a portion of the annular body not defining the protrusion; and a magnet coupled to the annular body by being received within a portion of the annular body defining the protrusion, the portion extending from the inner surface to the outer surface, the magnet configured to secure the cigar holder to a surface of a structure that is separate from the cigar holder.

21. The cigar holder of claim 20, wherein the annular body defines an opening, the opening defined in and extending through each of the outer surface and the inner surface, the opening configured to reduce a force required to stretch the elastomeric material forming the annular body and thereby increase an inner diameter defined by the inner surface.

22. The cigar holder of claim 20, wherein the elastomeric material is silicone rubber.

23. The cigar holder of claim 20, wherein the protrusion defines:

a face portion being flat, the face portion defining an aperture aligned with a hole in the magnet; and a side portion connecting the face portion to the surrounding portion of the outer surface.

24. The cigar holder of claim 20, wherein the elastomeric material defines one of a) a compression set of 50% or less, as measured according to ASTM D-395B (22 hours @ 158° F.) and b) a Shore A hardness of less than 30.

25. The cigar holder of claim 19, wherein the protrusion defines a protrusion height measuring less than or equal to two times a maximum wall thickness of a portion of the annular body not defining the protrusion.

26. The cigar holder of claim 19, wherein a portion of the magnet is positioned radially outward, with respect to the axis of the annular body, from a portion of the outer surface of the annular body not defining the protrusion.

27. The cigar holder of claim 19, further comprising a plate disposed next to the magnet, the plate being coupled to the annular body by enclosure within the annular body.

28. A method of using the cigar holder of claim 1, the method comprising:

receiving a cigar within the annular body of the cigar holder along the axis of the annular body; and holding the cigar within the annular body with and between opposing protuberances of the plurality of protuberances.

29. A method of manufacturing a cigar holder, the method comprising:

positioning a magnet within a mold;

forming an annular body defining an inner surface and an outer surface and formed from an elastomeric material; forming the annular body comprising:

forming a protrusion extending outward in a radial direction from a surrounding portion of the outer surface with respect to an axis of the annular body; and forming one of an opening and a plurality of protuberances in the inner surface of the annular body, wherein:

the opening, when formed, extends radially outward from the inner surface to the outer surface and is configured to allow stretching of the annular body to increase a diameter of the annular body; and each of the plurality of protuberances, when formed, extends inward in a radial direction from a surrounding portion of the inner surface with respect to the axis of the annular body, each of the plurality of protuberances able to return to its original shape after being bent during use; and coupling the magnet to the annular body by receiving the magnet within a portion of the annular body defining the protrusion, the portion extending from the inner surface to the outer surface, the magnet configured to secure the cigar holder to a surface of a structure that is separate from the cigar holder.

30. The method of claim 29, further comprising forming the opening in the inner surface of the annular body, the opening extending radially outward from the inner surface to the outer surface and configured to allow stretching of the annular body to increase a diameter of the annular body.

* * * * *